US012126116B2

(12) United States Patent
Rodriguez Acosta et al.

(10) Patent No.: US 12,126,116 B2
(45) Date of Patent: Oct. 22, 2024

(54) VEHICLE ELECTRICAL DISTRIBUTION CENTER WITH GEAR DRIVEN MATING ASSIST SYSTEM

(71) Applicant: Aptiv Technologies AG, Schaffhausen (CH)

(72) Inventors: Erick Adrian Rodriguez Acosta, Quintas del Valle (MX); Naiki Alejandra Reynoso Galvan, Jardin de las Moras (MX)

(73) Assignee: APTIV TECHNOLOGIES AG, Schaffhausen (CH)

( * ) Notice: Subject to any disclaimer, the term of this patent is extended or adjusted under 35 U.S.C. 154(b) by 356 days.

(21) Appl. No.: 17/856,367

(22) Filed: Jul. 1, 2022

(65) Prior Publication Data

US 2024/0006814 A1 Jan. 4, 2024

(51) Int. Cl.
*H01R 13/62* (2006.01)
*H01R 13/502* (2006.01)
*H01R 13/629* (2006.01)

(52) U.S. Cl.
CPC ..... *H01R 13/62944* (2013.01); *H01R 13/502* (2013.01); *H01R 13/62927* (2013.01); *H01R 13/62977* (2013.01); *H01R 2201/26* (2013.01)

(58) Field of Classification Search
CPC ............ H01R 13/62944; H01R 13/502; H01R 13/62927; H01R 13/62977; H01R 2201/26; H01R 13/631
See application file for complete search history.

(56) References Cited

U.S. PATENT DOCUMENTS 5,489,224 A * 2/1996 Schwarz .......... H01R 13/62977 439/752
9,917,402 B1 3/2018 Campbell et al.
10,326,237 B1 * 6/2019 Campos ................. H01R 24/84
10,566,728 B1 * 2/2020 Sundarakrishnamachari ............. H01R 13/6278
10,840,641 B2 11/2020 Aoshima et al.
11,437,758 B1 * 9/2022 Reedy .............. H01R 13/62955
2003/0139076 A1 * 7/2003 Martin ............. H01R 13/62944 439/157
2012/0149243 A1 * 6/2012 Ohnishi ................ H01R 43/24 29/883

(Continued)

FOREIGN PATENT DOCUMENTS

JP 2013214436 A 10/2013

*Primary Examiner* — Truc T Nguyen
(74) *Attorney, Agent, or Firm* — Billion & Armitage

(57) ABSTRACT

An automotive electrical distribution center assembly includes a mounting frame, a first pair of stacked gears rotatably attached to a side of the mounting frame and a second pair of stacked gears rotatably attached to an opposite side of the mounting frame, a moveable driver surrounding the mounting frame and defining four first linear gear racks that each engage a first gear of the first and second pairs of stacked gears, and an electrical distribution center attached to the driver. The electrical distribution center defines four second liner gear racks that each engage a second gear of the first and second pairs of stacked gears. Linear movement of the driver relative to the mounting frame causes rotational movement of the first and second pairs of stacked gears, thereby causing linear movement of the electrical distribution center to relative the mounting frame.

20 Claims, 5 Drawing Sheets

(56) References Cited

U.S. PATENT DOCUMENTS

| | | | | |
|---|---|---|---|---|
| 2014/0065857 | A1* | 3/2014 | Guillanton | H01R 13/641 439/131 |
| 2014/0273566 | A1* | 9/2014 | Allgood | H01R 13/516 439/157 |
| 2017/0098908 | A1* | 4/2017 | Juds | H01F 7/06 |
| 2017/0102424 | A1* | 4/2017 | Maalouf | H01R 13/502 |
| 2018/0226749 | A1* | 8/2018 | Campbell | H01R 13/62944 |
| 2019/0176634 | A1* | 6/2019 | Na | F16H 1/20 |
| 2019/0341726 | A1* | 11/2019 | Listing | H01R 13/6608 |
| 2021/0013676 | A1* | 1/2021 | Sassano | H05K 7/1489 |
| 2023/0034074 | A1* | 2/2023 | Chen | H05K 1/148 |

* cited by examiner

VEHICLE ELECTRICAL DISTRIBUTION CENTER WITH GEAR DRIVEN MATING ASSIST SYSTEM

TECHNICAL FIELD

This disclosure is generally directed to electrical distribution centers used in motor vehicles and more particularly to a vehicle electrical distribution center having a gear driven mating assist system.

BACKGROUND

Mechanical assist connectors are the typical method of mating the vehicle harness to the Electrical Centers (EC). There are several types of mechanical assist methods used with EC, including "top down" bolted connection, bolt-nut mechanical connection, "bottom up" bolted connection, usage of a connector lever lock, EC dual cam lever lock and EC single cam/slide lever lock. Although bolted connections are the most common on current EC designs due to the perception customers have on this approach (very robust connection method and there is less handling of connectors into the EC cavities, therefore their assembly time is reduced), costs of bolts are generally higher than plastic lever locks, so it is a higher cost option, and requires special tools at the vehicle assembly plant for assembly. On the other hand, the most severe failure mode on mechanical assisted systems, such as lever locks connectors, is plastic deflection of the EC shroud/connector lever that doesn't allow for a proper contact overlap between the male and female terminals. Additionally, careful consideration of ergonomic effort to install the EC must be taken, since it will be a manual operation on the lever handle. Engage force and packaging space ultimately limit the usage of connector lever locks in a vehicle since a larger lever would be required for higher total engage force of a connector to meet ergonomic limits.

SUMMARY

According to one or more aspects of the present disclosure, an automotive electrical distribution center assembly includes a mounting frame configured to receive and retain a plurality of electrical connectors of an electrical system and a first pair of stacked gears rotatably attached to a side of the mounting frame and a second pair of stacked gears rotatably attached to an opposite side of the mounting frame. The automotive electrical distribution center assembly further includes a moveable driver surrounding the mounting frame and defining four first linear gear racks that each engage a first gear of the first and second pairs of stacked gears and an electrical distribution center attached to the driver and having a plurality of mating connectors configured to interface with the plurality of electrical connectors retained in the mounting frame. The electrical distribution center defines four second liner gear racks that each engage a second gear of the first and second pairs of stacked gears. Linear movement of the driver relative to the mounting frame causes rotational movement of the first and second pairs of stacked gears, thereby causing linear movement of the electrical distribution center relative to the mounting frame.

In one or more embodiments of the automotive electrical distribution center assembly according to the previous paragraph, the mounting frame defines apertures in which the four second liner gear racks may be received.

In one or more embodiments of the automotive electrical distribution center assembly according to any one of the previous paragraphs, a ratio of a diameter of the first gears of the first and second pairs of stacked gears to a diameter of the second gears of the first and second pairs of stacked gears is in a range of about 2:1 to 3:1.

In one or more embodiments of the automotive electrical distribution center assembly according to any one of the previous paragraphs, a ratio of a pitch of gear teeth of the first linear gear racks to a pitch of gear teeth of the second linear gear racks is in a range of about 2:1 to 3:1.

In one or more embodiments of the automotive electrical distribution center assembly according to any one of the previous paragraphs, the mounting frame includes a splash shield.

In one or more embodiments of the automotive electrical distribution center assembly according to any one of the previous paragraphs, the driver comprises four side walls defining the four first linear gear racks and a top wall interconnected to the four side walls, thereby enclosing the electrical distribution center.

In one or more embodiments of the automotive electrical distribution center assembly according to any one of the previous paragraphs, inner surfaces of the four side walls define the four first linear gear racks.

In one or more embodiments of the automotive electrical distribution center assembly according to any one of the previous paragraphs, the first and second pairs of stacked gears are disposed between the mounting frame and the driver.

In one or more embodiments of the automotive electrical distribution center assembly according to any one of the previous paragraphs, the mounting frame and the driver define alignment features configured to maintain proper engagement of the first gears of the first and second pairs of stacked gears with the first gear racks.

In one or more embodiments of the automotive electrical distribution center assembly according to any one of the previous paragraphs, the electrical distribution center and the driver define alignment features configured to maintain proper engagement of the second gears of the first and second pairs of stacked gears with the second gear racks.

According to one or more aspects of the present disclosure, a method of assembling an automotive electrical distribution center includes inserting a plurality of electrical connectors of a vehicle electrical system into a mounting frame. The mounting frame has a first pair of stacked gears rotatably attached to a side of the mounting frame and a second pair of stacked gears rotatably attached to an opposite side of the mounting frame. The method further includes attaching an electrical distribution center to a movable driver having four first linear gear racks. The electrical distribution center has a plurality of mating connectors that are configured to interface with the plurality of electrical connectors retained in the mounting frame. The method additionally includes placing the driver around the mounting frame and engaging each of the four first linear gear racks with a first gear of the first and second pairs of stacked gears. The electrical distribution center defines four second liner gear racks. The method also includes engaging each of the four second liner gear racks with a second gear of the first and second pairs of stacked gears and linearly moving the driver relative to the mounting frame, thereby rotating the first and second pairs of stacked gears and thereby linear moving the plurality of mating connectors in the electrical distribution center relative to the plurality of electrical connectors in the mounting frame.

In one or more embodiments of the method according to the previous paragraph, the mounting frame defines apertures in which the four second liner gear racks may be received.

In one or more embodiments of the method according to any one of the previous paragraphs, a ratio of a diameter of the first gears of the first and second pairs of stacked gears to a diameter of the second gears of the first and second pairs of stacked gears is in a range of about 2:1 to 3:1.

In one or more embodiments of the method according to any one of the previous paragraphs, a ratio of a pitch of gear teeth of the first linear gear racks to a pitch of gear teeth of the second linear gear racks is in a range of about 2:1 to 3:1.

In one or more embodiments of the method according to any one of the previous paragraphs, the mounting frame includes a splash shield.

In one or more embodiments of the method according to any one of the previous paragraphs, the driver comprises four side walls defining the four first linear gear racks and a top wall interconnected to the four side walls, thereby enclosing the electrical distribution center.

In one or more embodiments of the method according to any one of the previous paragraphs, inner surfaces of the four side walls define the four first linear gear racks.

In one or more embodiments of the method according to any one of the previous paragraphs, the first and second pairs of stacked gears are disposed between the mounting frame and the driver.

In one or more embodiments of the method according to any one of the previous paragraphs, the mounting frame and the driver define alignment features configured to maintain proper engagement of the first gears of the first and second pairs of stacked gears with the first gear racks.

In one or more embodiments of the method according to any one of the previous paragraphs, the electrical distribution center and the driver define alignment features configured to maintain proper engagement of the second gears of the first and second pairs of stacked gears with the second gear racks.

BRIEF DESCRIPTION OF THE DRAWINGS

The present invention will now be described, by way of example with reference to the accompanying drawings, in which.

DETAILED DESCRIPTION

Figure 1:
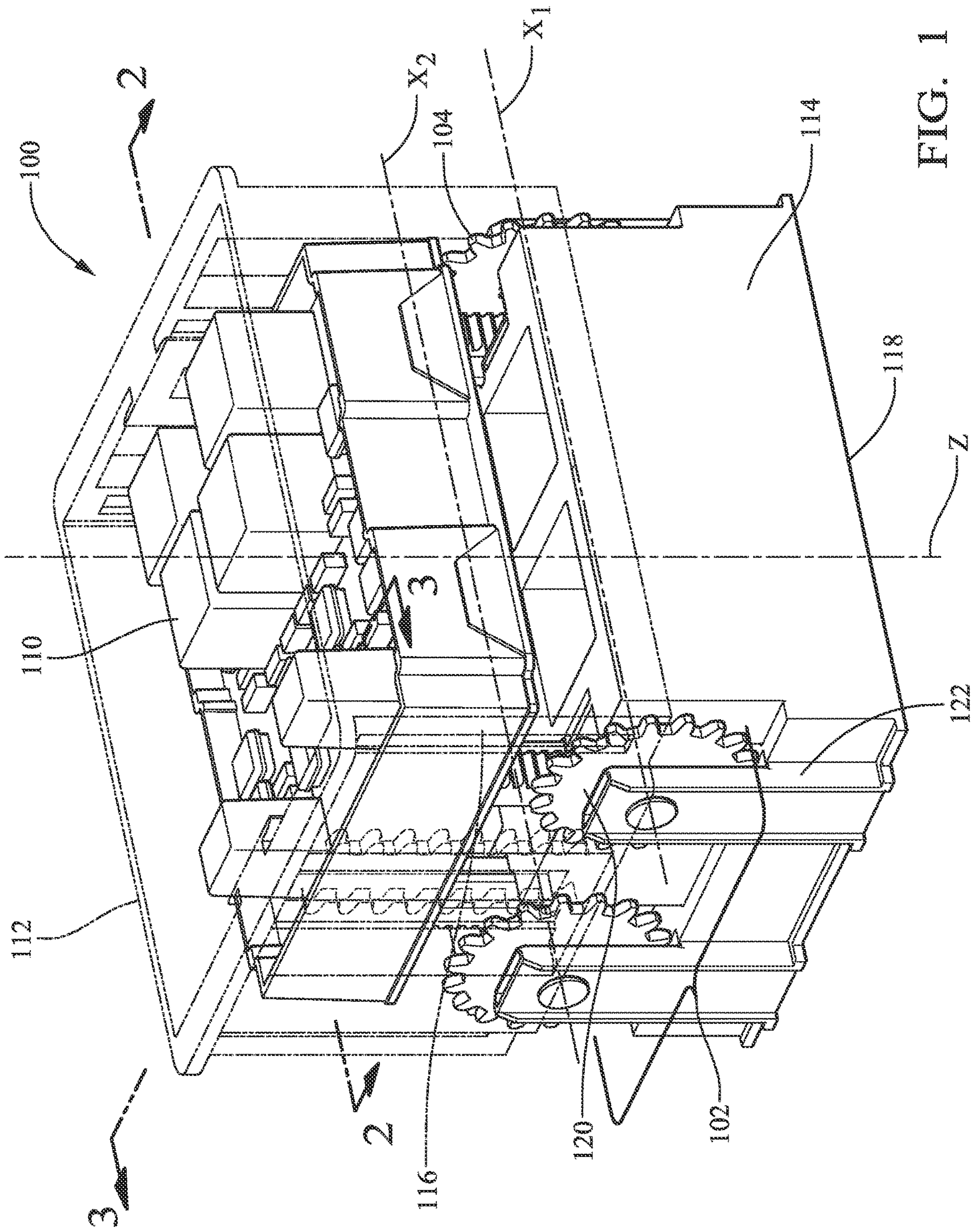
FIG. 1 illustrates a perspective view of a vehicle electrical distribution center having a gear driven mating assist system according to some embodiments.
Figure 2:
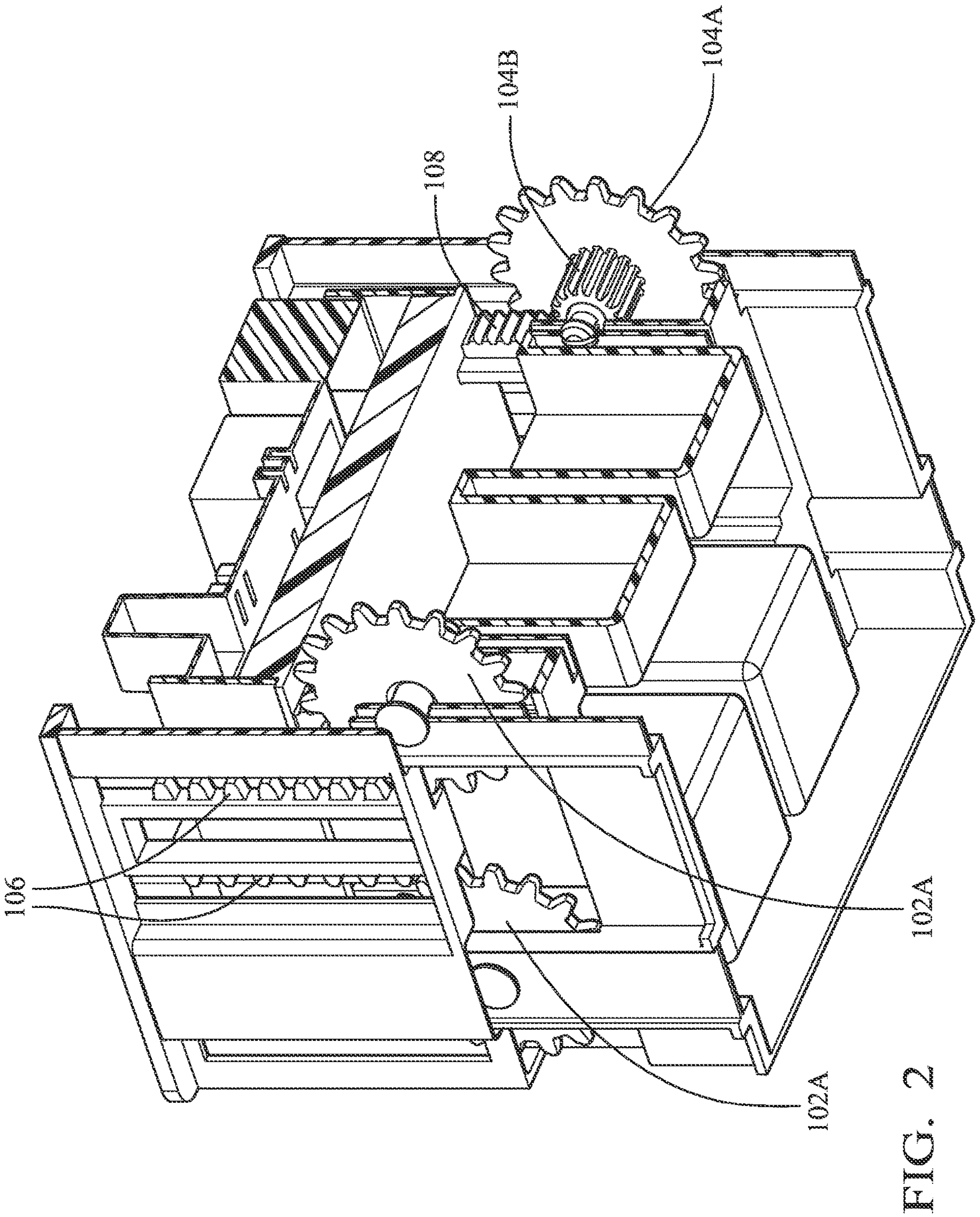
FIG. 2 illustrates a transparent view of the gears and gear racks of the vehicle electrical distribution center of FIG. 1 according to some embodiments.
Figure 3:
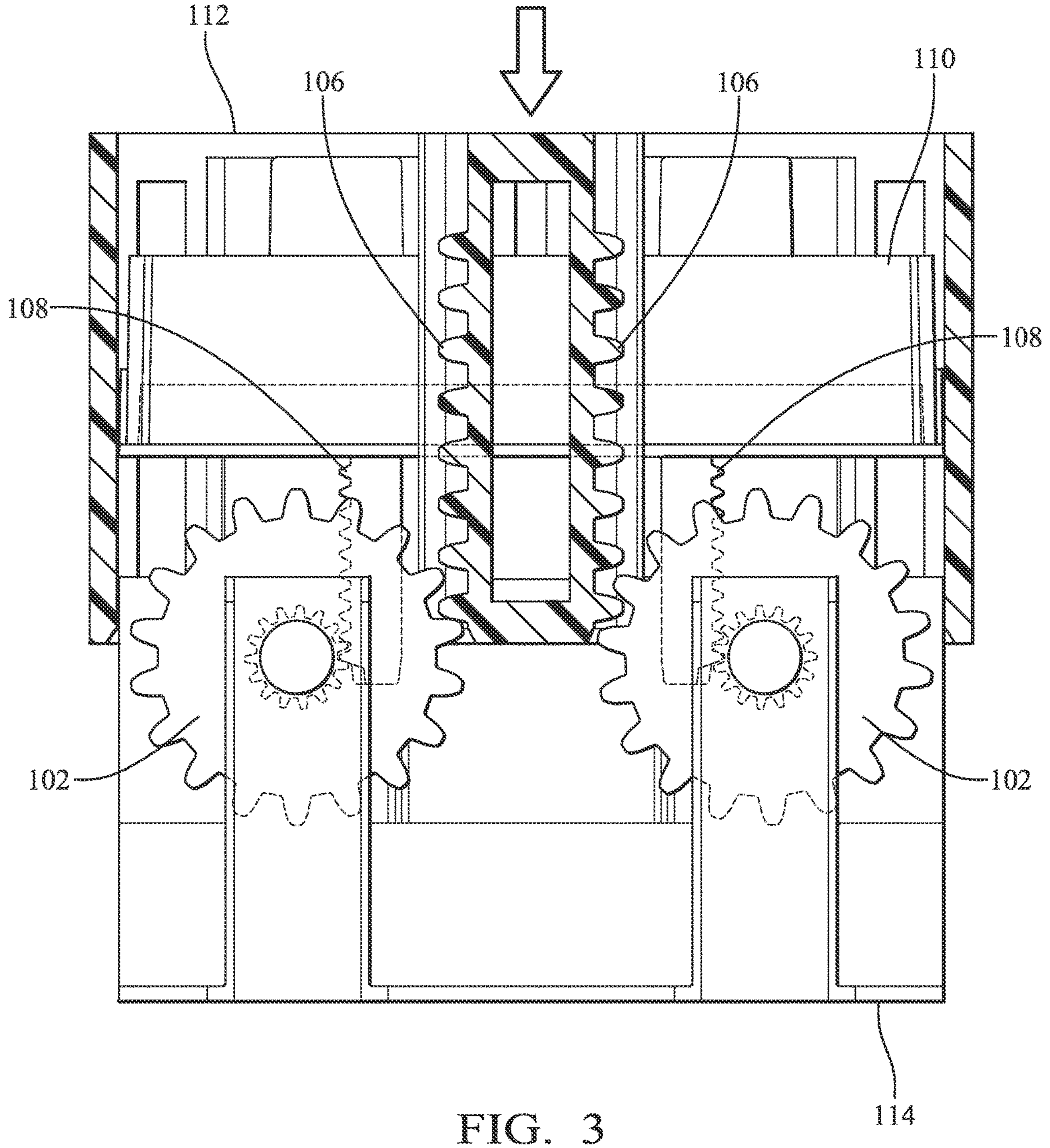
FIG. 3 illustrates a transparent right/left side view of the vehicle electrical distribution center of FIG. 1 in an unmated position according to some embodiments.
Figure 4:
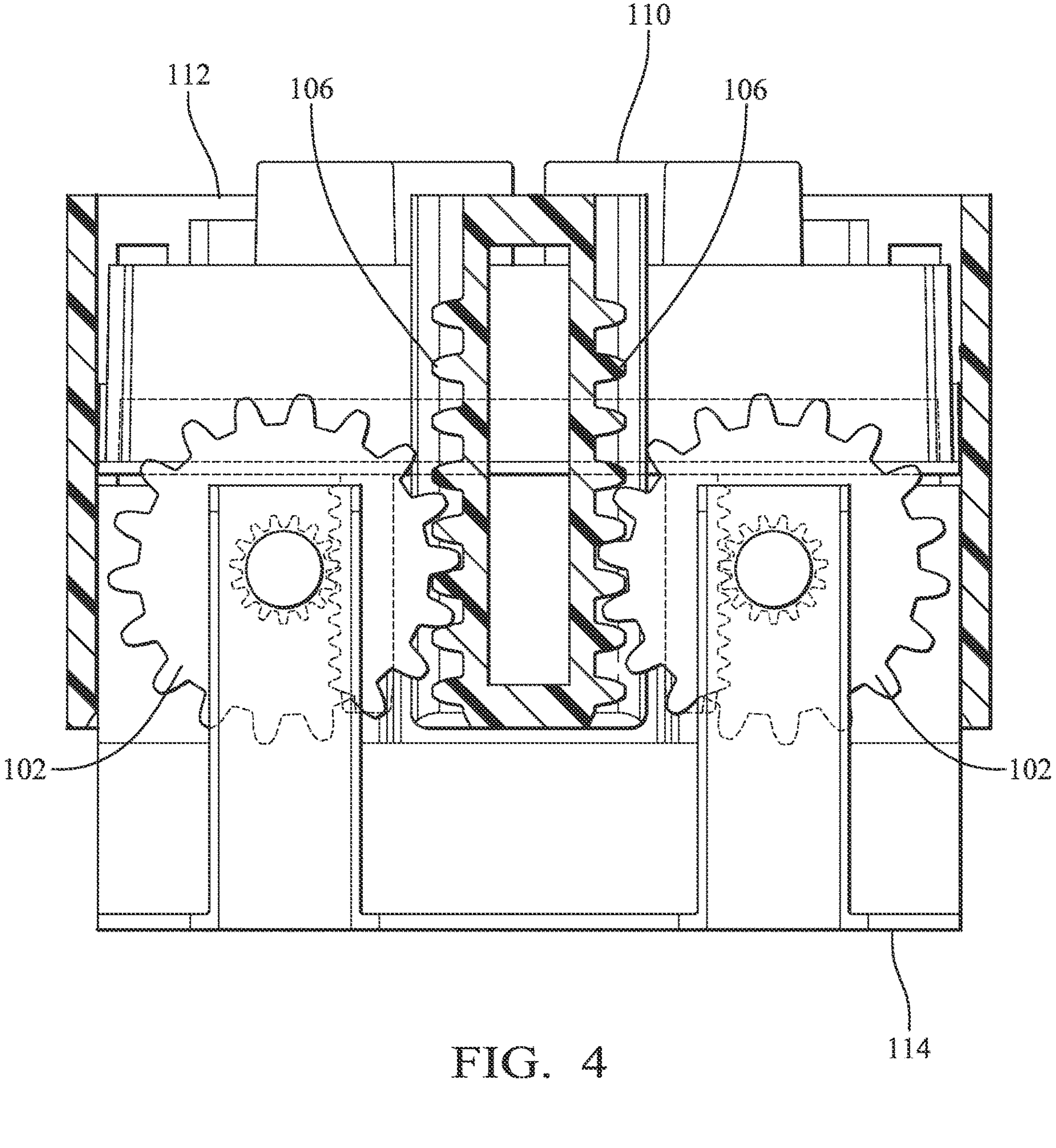
FIG. 4 illustrates a transparent right/left side view of the vehicle electrical distribution center of FIG. 1 in a mated position according to some embodiments.

An automotive electrical distribution center assembly, hereafter referred to as the assembly 100, that is designed to overcome the deficiencies of previous automotive electrical distribution centers is presented herein. The assembly 100 employs paired sets of gears 102, 104 and gear racks 106, 108 to provide the mating force necessary to properly mate the electrical connectors (not shown) of the electrical wiring harnesses of a vehicle's electrical system with the mating connectors of the electrical distribution center 110 while meeting ergonomic guidelines for force applied by an assembly operator. The assembly 100 includes a moveable driver 112 that is pushed or pulled in a direction parallel to the mating direction Z of the electrical connectors of the electrical wiring harnesses and the mating connectors of the electrical distribution center 110 to mate or unmate the respective connectors. This arrangement provides the benefit of eliminating off-axis forces that could cause misalignment of the connectors. It also eliminates the need for clearance around the assembly 100 to accommodate lever movement.

The assembly 100 includes a mounting frame 114 that is configured to receive and retain the electrical connectors of the electrical wiring harnesses. The mounting frame 114 has a first pair of stacked gears 102 that are rotatably attached to one side of the mounting frame 114 and a second pair of stacked gears 104 that are rotatably attached to an opposite side of the mounting frame 114. Each of the stacked gears 102 shares an axis of rotation X1, X2 with the stacked gear 104 opposite it. The first pair of stacked gears 102 are preferably identical to the second pair of stacked gears 104 and each stacked gear 102, 104 has two gears that share the respective common axis of rotation X1, X2. The stacked gears 102, 104 each include a first, larger gear 102A, 104A and a second smaller gear 102B, 104B that is preferably integrally formed with the first gear 102A, 104A.

A box shaped moveable driver 112 surrounds the mounting frame 114. Interior walls of the driver 112 define four first linear gear racks 106 that are also arranged in pairs on opposite sides of the driver 112. The first and second pairs of stacked gears 102, 104 are arranged between the mounting frame 114 and the interior walls of the driver 112. Each of the first linear gear racks 106 engage the first gear 102A, 104A of the first and second pairs of stacked gears 102, 104.

The electrical distribution center 110 is slidably attached to the driver 112. The electrical distribution center 110 has a plurality of mating connectors that are configured to interface with the plurality of electrical connectors retained in the mounting frame 114. The electrical distribution center 110 has electrical circuitry including fuses, relays, controllers, and other electrical components interconnected to the plurality of mating connectors. The electrical distribution center 110 defines four second liner gear racks 108 extending from the surface of the electrical distribution center 110. The second linear gear racks 108 are also arranged in pairs on opposite sides of the electrical distribution center 110. Each of the second linear gear racks 108 engage the second gear 102B, 104B of the first and second pairs of stacked gears 102, 104.

Linear movement of the driver 112 relative to the mounting frame 114 along the mating axis Z causes rotation of the first and second pairs of stacked gears 102, 104 via the engagement of the first gears 102A, 104A with the first linear gear racks 106. This rotates the second gears 102B, 104B which causes linear movement of the electrical distribution center 110 relative to the mounting frame 114 due to the engagement of the second gears 102B, 104B with the second linear gear racks 108. This, in turn causes linear movement of the mating connectors in the electrical distribution center 110 relative to the electrical connectors in the mounting frame 114 in order to mate or unmate the connectors.

The mounting frame 114 defines apertures 116 in which the four second liner gear racks 108 may be received as they are moved by the second gears 102B, 104B.

A ratio of a diameter of the first gears 102A, 104A of the first and second pairs of stacked gears 102, 104 to a diameter of the second gears 102B, 104B of the first and second pairs of stacked gears 102, 104 is in a range of about 2:1 to 3:1. Correspondingly, a ratio of a pitch of gear teeth of the first linear gear racks 106 to a pitch of gear teeth of the second linear gear racks 108 is also in a range of about 2:1 to 3:1. This provides the mechanical benefit of providing a connector mating force that is two to three times greater than the force applied to the driver 112 by an assembly operator.

The mounting frame 114 may be formed to includes a splash shield 118 and the driver 112 may include a cover over the electrical distribution center 110 to reduce the exposure of the electrical distribution center 110 to water or other liquid contaminants in the vehicle.

The mounting frame 114 and the driver 112 define alignment features in the form of ribs 120 and channels 122 that are configured to maintain proper engagement of the first gears 102A, 104A of the first and second pairs of stacked gears 102, 104 with the first gear racks 106. Similarly, the electrical distribution center 110 and the mounting frame 114 define alignment features in the form of ribs 124 and channels 126 that are configured to maintain proper engagement of the second gears 102B, 104B of the first and second pairs of stacked gears 102, 104 with the second gear racks 108 as well as alignment of the electrical connectors of the electrical wiring harnesses of a vehicle's electrical system in the mounting frame 114 with the mating connectors of the electrical distribution center 110.

The arrangement of the first and second pairs of stacked gears 102, 104, the first linear gear racks 106, and the second linear gear racks 108 provide balanced mating forces that are less likely to cause deformation of the electrical distribution center 110 and mounting frame 114 and subsequent misalignment of the connectors. The round stacked gears 102, 104 also provide the benefit of not requiring the gears to be "clocked" to a desired starting position before engaging the driver 112. The assembly 100 also provides the benefit of having a shorter dimension along the mating axis Z than previous bolted or lever-actuated electrical distribution center assemblies.

Figure 5:
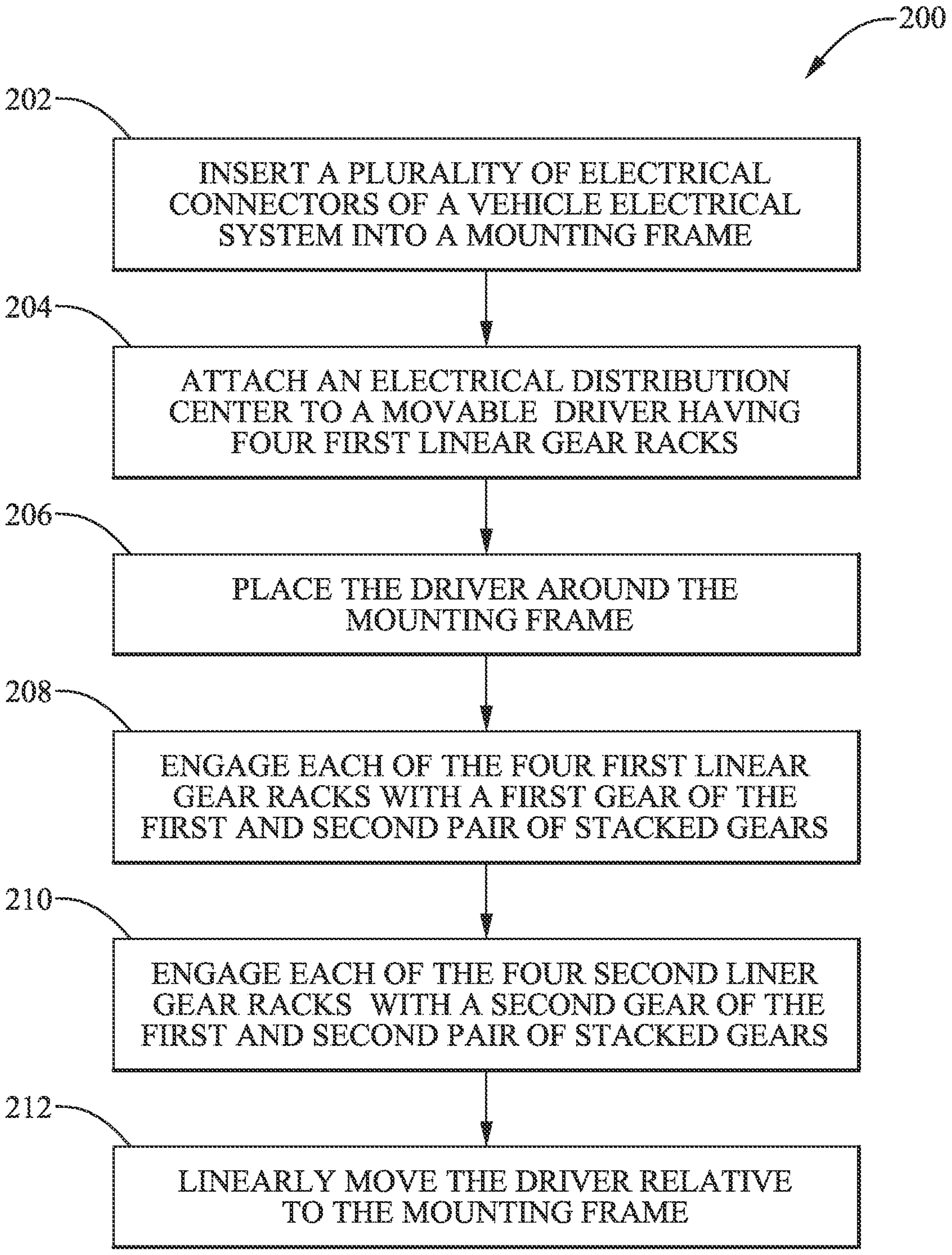
FIG. 5 illustrates a flow chart of a method of assembling a vehicle electrical distribution center having a gear driven mating assist system according to some embodiments.

A method 200 of assembling an automotive electrical distribution center, such as the assembly 100, is shown in FIG. 5. The method 200 includes the following steps:

STEP 202, INSERT A PLURALITY OF ELECTRICAL CONNECTORS OF A VEHICLE ELECTRICAL SYSTEM INTO A MOUNTING FRAME, includes inserting a plurality of electrical connectors of a vehicle electrical system 100 into a mounting frame 114. The mounting frame 114 has a first pair of stacked gears 102 that are rotatably attached to a side of the mounting frame 114 and a second pair of stacked gears 104 that are rotatably attached to an opposite side of the mounting frame 114;

STEP 204, ATTACH AN ELECTRICAL DISTRIBUTION CENTER TO A MOVABLE DRIVER HAVING FOUR FIRST LINEAR GEAR RACKS, includes attaching an electrical distribution center 110 to a movable driver 112 having four first linear gear racks 106. The electrical distribution center 110 has a plurality of mating connectors that are configured to interface with the plurality of electrical connectors retained in the mounting frame 114;

STEP 206, PLACE THE DRIVER AROUND THE MOUNTING FRAME, includes placing the driver 112 around the mounting frame 114;

STEP 208, ENGAGE EACH OF THE FOUR FIRST LINEAR GEAR RACKS WITH A FIRST GEAR OF THE FIRST AND SECOND PAIRS OF STACKED GEARS, includes engaging each of the four first linear gear racks 106 with a first gear 104A of the first and second pairs of stacked gears 104. The electrical distribution center 110 defines four second liner gear racks 108;

STEP 210, ENGAGE EACH OF THE FOUR SECOND LINER GEAR RACKS WITH A SECOND GEAR OF THE FIRST AND SECOND PAIRS OF STACKED GEARS, includes engaging each of the four second liner gear racks 108 with a second gear 104B of the first and second pairs of stacked gears 104; and STEP 212, LINEARLY MOVE THE DRIVER RELATIVE TO THE MOUNTING FRAME, includes linearly moving the driver 112 relative to the mounting frame 114.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An automotive electrical distribution center assembly, comprising:

a mounting frame configured to receive and retain a plurality of electrical connectors of an electrical system;

a first pair of stacked gears rotatably attached to a side of the mounting frame and a second pair of stacked gears rotatably attached to an opposite side of the mounting frame;

a moveable driver surrounding the mounting frame and defining four first linear gear racks that each engage a first gear of the first and second pairs of stacked gears; and an electrical distribution center attached to the driver and having a plurality of mating connectors configured to interface with the plurality of electrical connectors retained in the mounting frame, wherein the electrical distribution center defines four second liner gear racks that each engage a second gear of the first and second pairs of stacked gears, wherein linear movement of the driver relative to the mounting frame causes rotational movement of the first and second pairs of stacked gears, thereby causing linear movement of the electrical distribution center relative to the mounting frame.

2. The automotive electrical distribution center assembly in accordance with claim 1, wherein the mounting frame defines apertures in which the four second liner gear racks may be received.

3. The automotive electrical distribution center assembly in accordance with claim 1, wherein a ratio of a diameter of the first gears of the first and second pairs of stacked gears to a diameter of the second gears of the first and second pairs of stacked gears is in a range of about 2:1 to 3:1.

4. The automotive electrical distribution center assembly in accordance with claim 1, wherein a ratio of a pitch of gear teeth of the first linear gear racks to a pitch of gear teeth of the second linear gear racks is in a range of about 2:1 to 3:1.

5. The automotive electrical distribution center assembly in accordance with claim 1, wherein the mounting frame includes a splash shield.

6. The automotive electrical distribution center assembly in accordance with claim 1, wherein the driver comprises four side walls defining the four first linear gear racks and a top wall interconnected to the four side walls, thereby enclosing the electrical distribution center.

7. The automotive electrical distribution center assembly in accordance with claim 6, wherein inner surfaces of the four side walls define the four first linear gear racks.

8. The automotive electrical distribution center assembly in accordance with claim 7, wherein the first and second pairs of stacked gears are disposed between the mounting frame and the driver.

9. The automotive electrical distribution center assembly in accordance with claim 1, wherein the mounting frame and the driver define alignment features configured to maintain proper engagement of the first gears of the first and second pairs of stacked gears with the first gear racks.

10. The automotive electrical distribution center assembly in accordance with claim 1, wherein the electrical distribution center and the driver define alignment features configured to maintain proper engagement of the second gears of the first and second pairs of stacked gears with the second gear racks.

11. A method of assembling an automotive electrical distribution center, comprising:

inserting a plurality of electrical connectors of a vehicle electrical system into a mounting frame, wherein the mounting frame has a first pair of stacked gears rotatably attached to a side of the mounting frame and a second pair of stacked gears rotatably attached to an opposite side of the mounting frame;

attaching an electrical distribution center to a movable driver having four first linear gear racks, wherein the electrical distribution center has a plurality of mating connectors configured to interface with the plurality of electrical connectors retained in the mounting frame;

placing the driver around the mounting frame;

engaging each of the four first linear gear racks with a first gear of the first and second pairs of stacked gears, wherein the electrical distribution center defines four second liner gear racks;

engaging each of the four second liner gear racks with a second gear of the first and second pairs of stacked gears; and linearly moving the driver relative to the mounting frame, thereby rotating the first and second pairs of stacked gears and thereby linearly moving the plurality of mating connectors in the electrical distribution center relative to the plurality of electrical connectors in the mounting frame.

12. The method in accordance with claim 11, wherein the mounting frame defines apertures in which the four second liner gear racks may be received.

13. The method in accordance with claim 11, wherein a ratio of a diameter of the first gears of the first and second pairs of stacked gears to a diameter of the second gears of the first and second pairs of stacked gears is in a range of about 2:1 to 3:1.

14. The method in accordance with claim 11, wherein a ratio of a pitch of gear teeth of the first linear gear racks to a pitch of gear teeth of the second linear gear racks is in a range of about 2:1 to 3:1.

15. The method in accordance with claim 11, wherein the mounting frame includes a splash shield.

16. The method in accordance with claim 11, wherein the driver comprises four side walls defining the four first linear gear racks and a top wall interconnected to the four side walls, thereby enclosing the electrical distribution center.

17. The method in accordance with claim 16, wherein inner surfaces of the four side walls define the four first linear gear racks.

18. The method in accordance with claim 17, wherein the first and second pairs of stacked gears are disposed between the mounting frame and the driver.

19. The method in accordance with claim 11, wherein the mounting frame and the driver define alignment features configured to maintain proper engagement of the first gears of the first and second pairs of stacked gears with the first gear racks.

20. The method in accordance with claim 11, wherein the electrical distribution center and the driver define alignment features configured to maintain proper engagement of the second gears of the first and second pairs of stacked gears with the second gear racks.

* * * * *